US010330520B2

(12) United States Patent
Pommerening et al.

(10) Patent No.: US 10,330,520 B2
(45) Date of Patent: Jun. 25, 2019

(54) SYSTEM FOR AUTOMATICALLY INITIALIZING A WEIGHING PROCESS OF ONE OR MORE LOADS AT A CONCRETE PLANT OR AN ASPHALT PLANT

(71) Applicants: Brent Robert Pommerening, Shorewood, IL (US); Patrick Alan Dunbar, Downers Grove, IL (US)

(72) Inventors: Brent Robert Pommerening, Shorewood, IL (US); Patrick Alan Dunbar, Downers Grove, IL (US)

(*) Notice: Subject to any disclaimer, the term of this patent is extended or adjusted under 35 U.S.C. 154(b) by 12 days.

(21) Appl. No.: 15/499,894

(22) Filed: Apr. 28, 2017

(65) Prior Publication Data

US 2018/0313685 A1 Nov. 1, 2018

(51) Int. Cl.
| *G01G 19/02* | (2006.01) |
| *G01G 23/37* | (2006.01) |
| *G01G 23/42* | (2006.01) |
| *G06Q 10/08* | (2012.01) |
| *G06K 7/10* | (2006.01) |
| *G08G 1/123* | (2006.01) |
| *H04W 4/029* | (2018.01) |
| *G08G 1/00* | (2006.01) |

(52) U.S. Cl.
CPC ......... *G01G 19/021* (2013.01); *G01G 19/022* (2013.01); *G01G 23/3735* (2013.01); *G01G 23/42* (2013.01); *G06Q 10/087* (2013.01); *H04W 4/029* (2018.02); *G06K 7/10366* (2013.01); *G08G 1/20* (2013.01)

(58) Field of Classification Search
CPC .......... G08G 1/20; G08G 1/202; G08G 1/207; H04W 4/029; H04W 4/021; H04W 4/046; G01G 19/02; G01G 19/022; G01G 23/42; G01G 23/3728; G01G 23/3735; G01G 19/021; G06Q 10/087; G06Q 10/0833; G06K 7/10366
See application file for complete search history.

(56) References Cited

U.S. PATENT DOCUMENTS

| 4,605,081 | A | * | 8/1986 | Helmly, Jr. | ............ | G01G 19/02 |
| | | | | | | 177/1 |
| 4,831,539 | A | * | 5/1989 | Hagenbuch | ............ | G01G 19/08 |
| | | | | | | 177/1 |
| 5,822,224 | A | | 10/1998 | Nakanishi | | |
| 5,848,368 | A | * | 12/1998 | Allen | ...................... | G07C 5/008 |
| | | | | | | 701/50 |
| 8,626,541 | B2 | * | 1/2014 | Doan | ...................... | G06Q 10/00 |
| | | | | | | 705/1.1 |
| 2007/0007080 | A1 | | 1/2007 | Manthey | | |
| 2008/0011839 | A1 | | 1/2008 | Noll | | |

(Continued)

*Primary Examiner* — Randy W Gibson
(74) *Attorney, Agent, or Firm* — Richard A. Fagin

(57) ABSTRACT

A system for automatically initializing a weighing process of one or more loads at a concrete plant or an asphalt plant. The system includes a plant, a staging area, a truck and a fleet of trucks. Each truck contains one output device which contains a unique output device ID identifier, an output device reader or readers, a batch non-transitory storage media, a dispatch non-transitory storage media, a reader non-transitory storage media and a material load verification non-transitory storage media, a third party or cloud non-transitory storage media and a master truck file containing a truck file for each truck and a database.

19 Claims, 6 Drawing Sheets

(56) References Cited

U.S. PATENT DOCUMENTS

| | | |
|---|---|---|
| 2008/0028988 A1 | 2/2008 | Welker |
| 2008/0273415 A1 | 11/2008 | Thornton |
| 2010/0023170 A1 | 1/2010 | Sherwood |
| 2013/0297929 A1 | 11/2013 | Chaves |
| 2017/0335525 A1 | 11/2017 | Chambers |
| 2018/0010954 A1* | 1/2018 | Lowndes ............... G01G 19/12 |
| 2018/0247261 A1* | 8/2018 | Smith ................ G06Q 10/0833 |

* cited by examiner

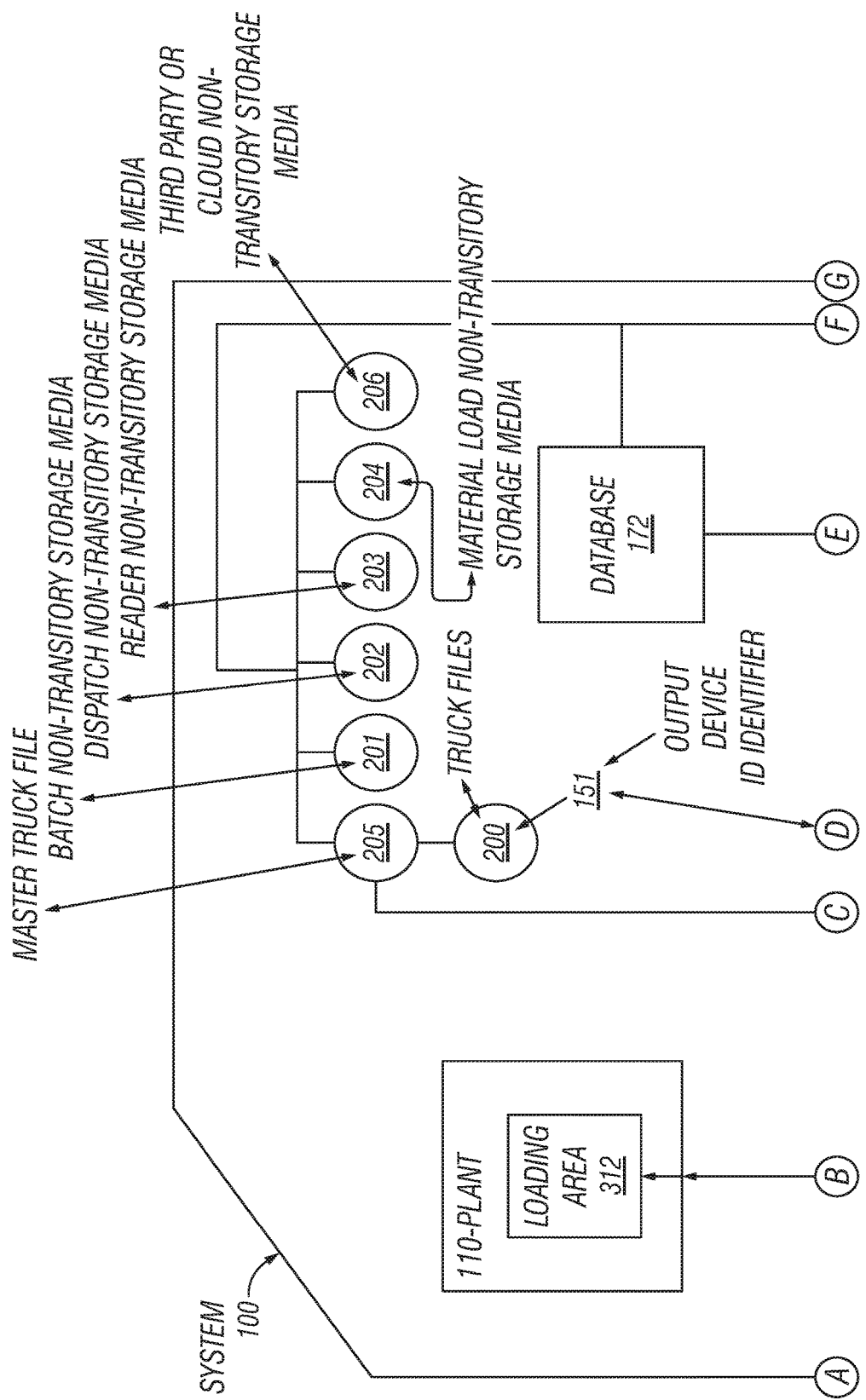

SYSTEM FOR AUTOMATICALLY INITIALIZING A WEIGHING PROCESS OF ONE OR MORE LOADS AT A CONCRETE PLANT OR AN ASPHALT PLANT

The present application claims the benefit of U.S. Provisional Patent Application No. 62/328,452 filed on Apr. 27, 2016, the entire disclosure of which is incorporated by reference.

FIELD OF THE INVENTION

The present invention generally relates to a system for automatically initializing a weighing process of one or more loads at a concrete plant or an asphalt plant. More specifically, the present invention relates to a system for utilizing a staging area and various non-transitory storage media and hardware to automatically initialize a weighing process of one or more loads at a concrete plant or an asphalt plant.

DESCRIPTION OF THE RELATED ART

In the current art of initiating a weighing process for a particular load at a concrete plant or an asphalt plant, there are inefficiencies that exist and the process is not fully automated. These inefficiencies are very costly in terms of production and monetary losses. In the current art, the concept of zero-gap loading is not fully utilized. Current art remains largely ineffective and inefficient as a plant operator must manually select the next load, or in this case, the next load matrix to be weighed from the load queue then manually trigger the actual weighing process for each subsequent load at a plant. In the case of utilizing continuous discharge type operations such as paving operations, truck sequencing must still be considered by a dispatcher or a batch operator or a similar process and the risk of overweights or underweights may exist in the case that truck sequencing is not considered. Due to these human factors, idle time between a weighing of subsequent loads at the plant may exist, and consequently, zero-gap loading is not achieved By defining a physical staging area and incorporating the use of various non-transitory storage medias and hardware, the process of automatically initiating weighing of one or more loads in a queue at a plant is possible. This process is highly efficient, accurate, error-free, and zero-gap weighing of subsequent loads at the plant is possible. Since all of the necessary information for each future load at a plant is contained within the load queue and the fact that dispatchers may queue multiple loads or load matrices for future loading at once, the stage is set for achieving zero-gap weighing between loads at a plant.

For maximum efficiency at a plant it is essential that when any of the current load's batch constituents are fully discharged into the current truck and the scales or containers for the constituents are officially zeroed or available to be weighed, the weigh process is allowed to commence without any delay for any of the batch constituents required for the queued load for the current truck identified at the staging area of the plant in an automated manner. Zero-gap loading of subsequent loads and their constituents is essential for maximizing production and cost effectiveness at a plant.

BRIEF SUMMARY OF THE INVENTION

Major plant operations related to these fields include weighing, metering, and discharging of various raw materials and other constituents of varying proportions commonly known as mixes, in volumetric intervals onto specialized trucks for eventual delivery to an end user, in the most efficient and effective manner. A particular mix when weighed by targeted volume is commonly known as a batch or a load. Each truck receives its own batch or load and no individual batch or load may be shared between any trucks. Each load that is dispatched to a plant generates its own load matrix which contains all relevant information necessary for batching a particular load. Multiple matrices may exist at once and in this case all information is stored in a load queue in the batch non-transitory storage media for eventual batching.

It is an object of the present invention to provide a system for automatically initializing a weighing process of one or more loads at a concrete plant or an asphalt plant that includes a concrete plant, an asphalt plant, or other suitable plant, a fleet of trucks, a staging area, a loading area, an output device reader, an output device with a unique assigned output device identification or ID identifier for each truck in the fleet capable of communicating or being read by one or more output device readers, a server system, a plurality of databases, a material load verification non-transitory storage media, a batch non-transitory storage media, a dispatch non-transitory storage media, a reader non-transitory storage media, a master truck file containing individual truck files for each truck in the fleet, each truck file containing a mandatory data field for storing its unique output device ID identifier value, a load matrix, a load queue, and a cloud non-transitory storage media.

It is an object of the present invention to provide a system for automatically initializing a weighing process of one or more loads at a concrete plant or an asphalt plant that includes a physically defined staging area distinct from the loading area and discharge point of a plant which includes a strategically placed output device reader. The staging area is a designated area near the plant to which a truck's output device ID identifier is read by an output device reader.

It is an object of the present invention to provide a system for automatically initializing a weighing process of one or more loads at a concrete plant or an asphalt plant that includes verification and assurance that a load is weighed based on the information captured by the output device reader at the staging area of the plant and information contained in the load queue, the load matrix(s), and truck files, on an ongoing, load-to-load basis.

It is an object of the present invention to provide a system for automatically initializing a weighing process of one or more loads at a concrete plant or an asphalt plant that includes an electronically readable truck output ID device with its own unique output device ID identifier for each truck in a fleet.

It is an object of the present invention to provide a system for automatically initializing a weighing process of one or more loads at a concrete plant or an asphalt plant that has a controlled flow of the one or more trucks of the fleet in the staging area and loading area of the plant on a load-to-load basis.

It is an object of the present invention to provide a system for automatically initializing a weighing process of one or more loads at a concrete plant or an asphalt plant that controls the plant's batching control functionality in order to initiate a weighing process for the load of the truck currently at the staging area of the plant.

It is an object of the present invention to provide a system for automatically initializing a weighing process of one or more loads at a concrete plant or an asphalt plant that is controlling a plurality of non-transitory storage medias capable of communicating and interacting independently of each other or collectively for the purpose of exchanging data and comparing data values, data fields, and controlling batch plant functionality. These medias may or may not compare data fields simultaneously and the data paths or the sequential order of which the comparisons take place may vary so long as the data field comparisons occur across these medias for the purposes of testing. These non-transitory storage media may be capable of communicating with the mandatory master truck file and its mandatory constituents known as truck files, and the load matrices and load queue.

It is an object of the present invention to provide a system for automatically initializing a weighing process of one or more loads at a concrete plant or an asphalt plant that has the option to provide audio, visual, or other electronic feedback, to a truck, trucks, plant operators, or other personnel.

It is an object of the present invention to provide a system for automatically initializing a weighing process of one or more loads at a concrete plant or an asphalt plant that has an optional configuration to which the load matrices within the load queue does not have any primary key values assigned to them at the time of these load matrices being generated. A particular load matrix would be automatically be assigned to a particular truck utilizing non-transitory storage medias, hardware, a defined user configuration and data values obtained by the output device reader via the current truck's output device and it's corresponding unique output device ID identifier value after being read in the staging area.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described utilizing terms commonly employed by those skilled in the area to convey the substance of their work to other skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be discussed as multiple discrete operations, in turn in a manner that is most helpful in understanding the present invention. However, the order of description should not be construed as to imply that these operations are necessarily order dependent. In particular, these operations need not be performed in the order of the presentation.

The phrase, "in one embodiment" is used repeatedly. The phrase generally does not refer to the same embodiment, however, it may. The terms "comprising", "having", and "including" are synonymous, unless the context dictates otherwise.

Figure 1:
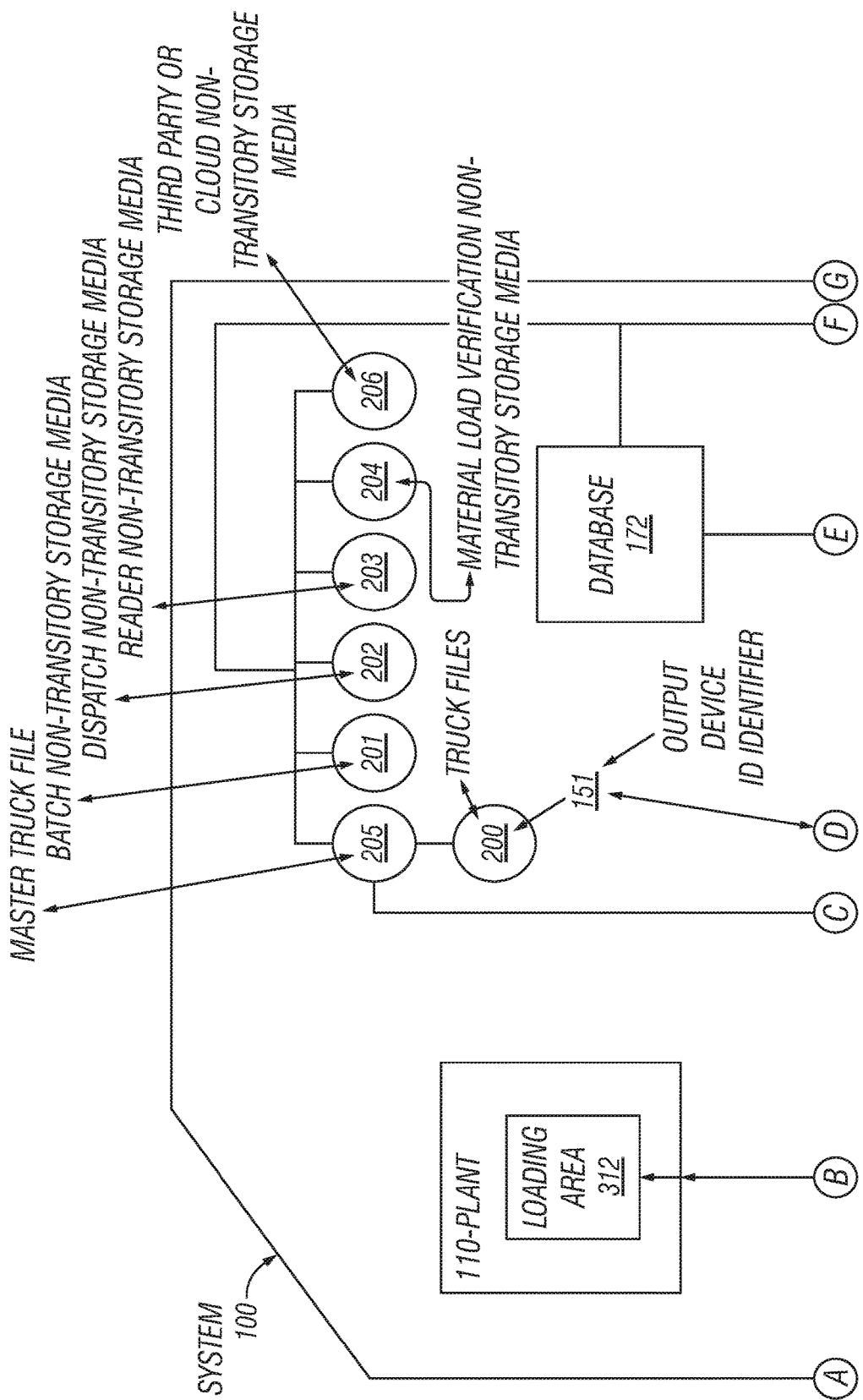
FIG. 1 illustrates and system for utilizing a staging area to automatically initialize a weighing process of one or more loads at a concrete plant or an asphalt plant, in accordance with one embodiment of the present invention.
Figure 1:
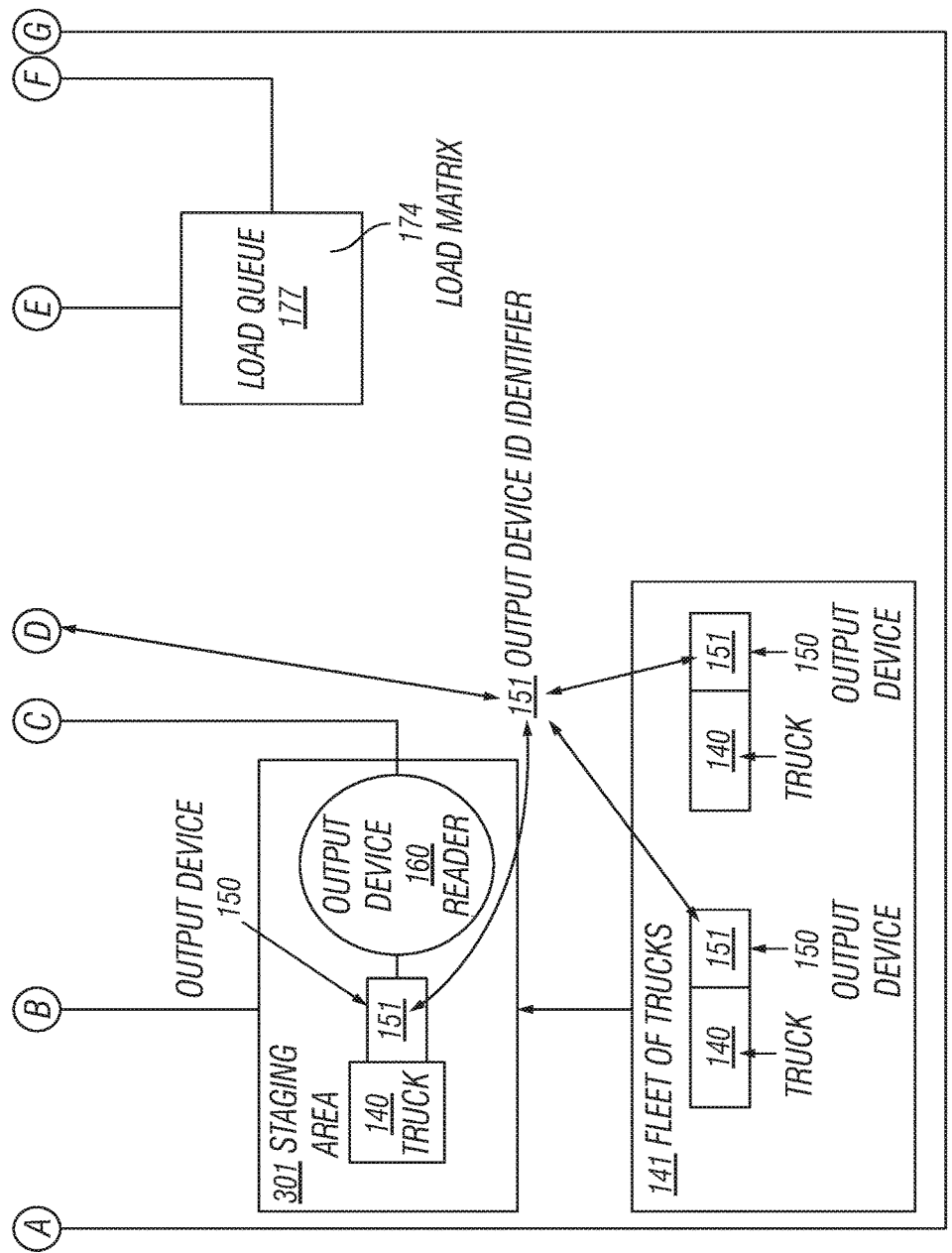

FIG. 1 Illustrates a system for utilizing a staging area to automatically initialize a weighing process of one or more loads at a concrete plant or an asphalt plant 100, in accordance with one embodiment of the present invention.

The system 100 may include a plant 110, a truck 140, and a fleet of trucks 141. Each truck 140 contains one output device 150 which contains its own unique output device ID identifier 151. The system 100 also includes an output device reader 160, a batch non-transitory storage media 201, a dispatch non-transitory storage media 202, a reader non-transitory storage media 203, a material load verification non-transitory storage media 204, a third party or a cloud non-transitory storage media 206, a master truck file 205 composed of one or more unique truck file(s) 200, and a database 172.

The plant 110 may include a staging area 301 and a loading area 312. The plant 110 may be a concrete plant, an asphalt plant, or other suitable plant. The truck 140 enters the staging area 301 near the plant 110 and eventually continues along a path into the loading area 312.

An output device 150 with a unique output device ID identifier 151 is affixed to each truck 140 in the fleet 141. Each individual output device 150 has a singular, unique, primary key type identifier 151, which is unique for each truck 140 in the fleet 141 for the purpose of uniquely identifying each truck 140 in the fleet 141. The output device reader 160 is strategically affixed to a fixed position in the staging area 301 of the plant 110 so that it is capable of reading the output device's 150 unique output device ID identifier value 151 of a truck 140 with an identifier technology selected from the group consisting of a radio frequency or RF transmitter signal, a radio frequency or a RF transponder signal, a QR code, a barcode, a camera, a global positioning satellite or a GPS signal, a license plate scanner, an image scanner, an electronic tracking signal, or similar technology.

A master truck file 205 containing a unique truck file 200 for each truck 140 for the fleet of trucks 141 exists on a database 172. Each truck 140 in the fleet 141 has its own unique truck file 200 stored on the database 172 within the master truck file 205. Each truck file 200 within the master truck file 205 may contain a plurality of truck identifiers and other pertinent information relevant to a specific truck 140 in a fleet 141 stored on the database 172. Each truck file 200 within the master truck file 205 may have a plurality of primary key type fields including, but not limited to a truck unit number 906, an output device ID identifier 151 value (mandatory), a license plate number 907, a VIN number 908, or a serial number 909. Each truck file 200 within the master truck file 205 may have a plurality of non-primary key type fields such as tare weight, gross weight limit, make, model, year, or age.

A load matrix 174 and load queue 177 may exist within the batch non-transitory storage media 201. The load matrix 174 may contain a plurality of data entry fields for a particular load including, but not limited to date, time, mix ID, slump, quantity, truck unit number 906, output device ID identifier 151 value, license plate number 907, VIN number 908, serial number 909, driver name, driver ID, net weight, make, model, year, age, mix constituent, target weights for mix constituents, comments, and ticket number for each load queued. At least one populated primary key field must exist in every load matrix 174. This field has a direct relationship to a common, pre-populated and stored primary key field that exists in all truck files 200, within the master truck file 205. Multiple loads and their corresponding load matrices 174 are stored within the load queue 177 in the batch non-transitory storage media 201. A load queue 177 may exist within the batch non-transitory storage media 201. The load queue 177 is a storage media comprised of one or more load matrices 174.

The material load verification non-transitory storage media 204 may be in communication with a database 172 which contains the master truck file 205 and one or more truck files 200, for a fleet of trucks 141. The material load verification non-transitory storage media 204 may be in communication with the load matrix 174 and the load queue 177. The material load verification non-transitory storage media 204 may be in communication with the output device reader 160 and/or the reader non-transitory storage media 203. The material load verification non-transitory storage media 204 may be in communication with the batch non-transitory storage media 201 for the purpose of controlling batch plant functionality.

The material load verification non-transitory storage media 204 initiates the capture of a truck's 140 unique output device ID identifier 151 value from the output device 150 via the output device reader 160. The material load verification non-transitory storage media 204 compares the data values captured by the output device reader 160 from an output device 150 and its corresponding output device ID identifier value 151 for the truck 140 being read in the staging area 301 of the plant 110 with the data field values stored within the truck files 200 within the master truck file 205 residing in the database 172 with data values within the data fields of the pending load matrices 174 residing within the load queue 177.

The material load verification non-transitory storage media 204 having instructions stored within, when executed, executes a method of comprising steps of capturing the current truck's 140 unique output device ID identifier value 151 from the output device 150 affixed to the truck 140 using an output device reader 160 in the staging area 301 of the plant 110. The captured output device ID identifier value 151 is referenced back to the truck files 200 within the master truck file 205 on the database 172.

The searching step includes comparing the captured output device ID identifier value 151 to the output device ID identifier values 151 stored in each of the truck files 200 within the master truck file 205 of the database 172. When the matching truck file 200 is found that contains the stored output device ID identifier value 151 for the current truck 140 read in the staging area 301, the primary key data fields for the particular matched truck file 200 are compared to the primary key data fields in the pending load matrices 174 within the load queue 177.

If any of the primary keys values found in the data fields being referenced for any of the load matrices 174 within the load queue 177 match any of the related primary key values in the data field for the matching truck file 200 within the master truck file 205 of the database 172, the weigh process may be allowed to initiate for the matching load matrix 174 for the current truck 140 in the staging area 301. Positive audio, visual, or electronic feedback may be given to the truck 140 in the staging area 301 indicating a load matrix 174 exists in the load queue 177 and is ready to be weighed automatically.

If any of the primary keys values found in the data fields being referenced for any of the load matrices 174 within the load queue 177 do not match any of the related primary key values in the data field for the matching truck file 200 within the master truck file 205 of the database 172, negative audio, visual, or electronic feedback may be given to the truck in the staging area indicating a load is not in queue for current truck 140 in the staging area 301.

Figure 2:
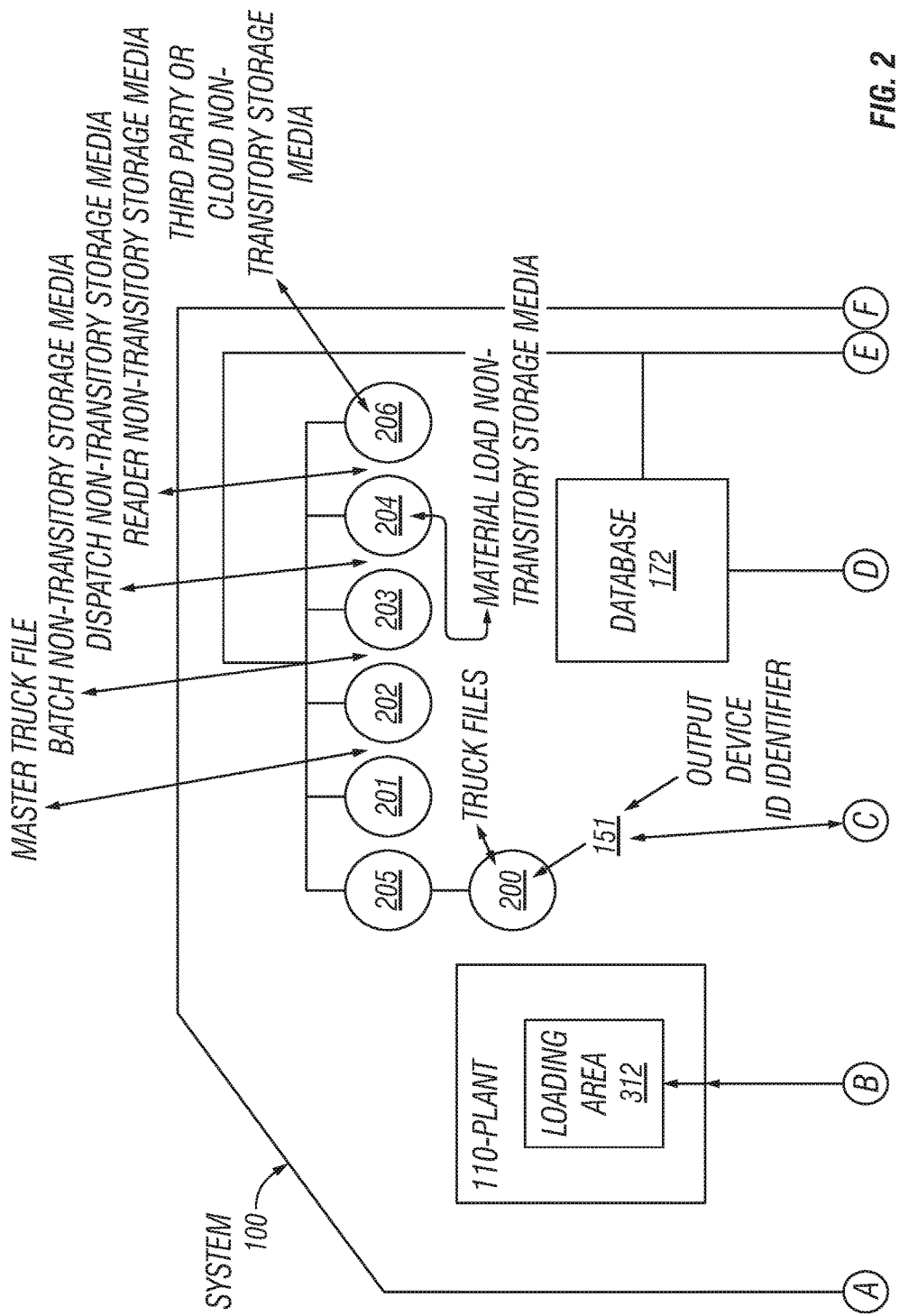
FIG. 2 illustrates and system for utilizing a staging area to automatically initialize a weighing process of one or more loads at a concrete plant or an asphalt plant, in accordance with one embodiment of the present invention.
Figure 2:
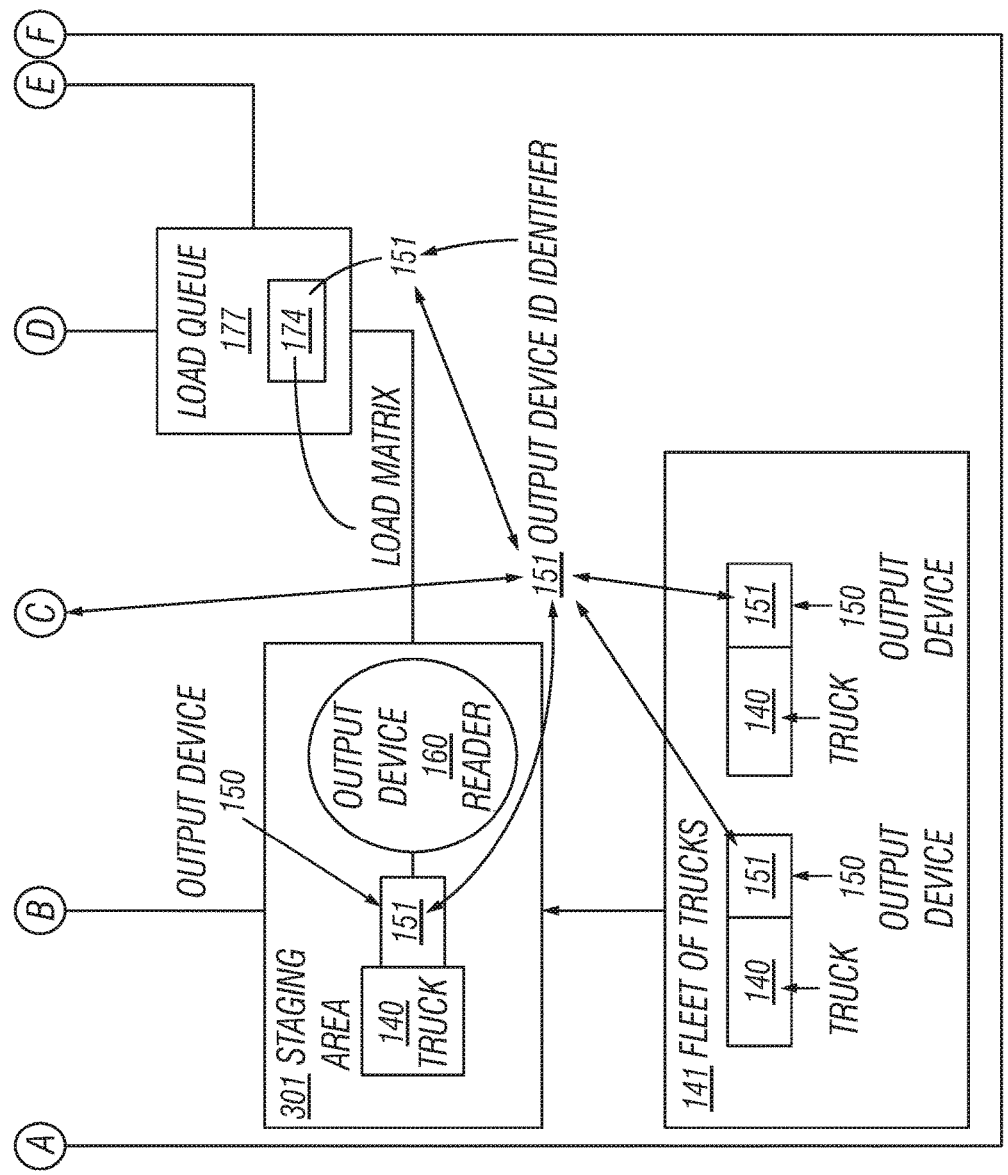

FIG. 2 illustrates a system for utilizing a staging area to automatically initialize a weighing process of one or more loads at a concrete plant or an asphalt plant 100, in accordance with one embodiment of the present invention.

The system 100 may include a plant 110, a truck 140, and a fleet of trucks 141. Each truck 140 contains one output device 150 which contains its own unique output device ID identifier 151. System also includes an output device reader 160, a batch non-transitory storage media 201, a dispatch non-transitory storage media 202, a reader non-transitory storage media 203, a material load verification non-transitory storage media 204, a third party or a cloud non-transitory storage media 206, a master truck file 205 composed of one or more unique truck file(s) 200, and a database 172.

The plant 110 includes a staging area 301 and a loading area 312. The plant 110 may be a concrete plant, an asphalt plant, or other suitable plant. The truck 140 enters the staging area 301 near the plant 110 and eventually continues along a path into the loading area 312.

An output device 150 with a unique output device ID identifier 151 is affixed to each truck 140 in the fleet 141. Each individual output device 150 has a singular, unique, primary key type identifier 151 which is unique for each truck 140 in the fleet 141 for the purpose of uniquely identifying each truck 140 in the fleet 141. The output device reader 160 is strategically affixed to a fixed position in the staging area 301 of the plant 110 so that it is capable of reading the output device's 150 unique output device ID identifier value 151 of a truck 140 with an identifier technology selected from the group consisting of a radio frequency or a RF transmitter signal, a radio frequency or RF transponder signal, a QR code, a barcode, a camera, a global positioning satellite or a GPS signal, a license plate scanner, an image scanner, an electronic tracking signal, or similar technology.

A master truck file 205 containing a unique truck file 200 for each truck 140 for the fleet of trucks 141 exists on a database 172. Each truck 140 in the fleet 141 has its own unique truck file 200 stored on the database 172 within the master truck file 205. Each truck file 200 within the master truck file 205 may contain a plurality of truck identifiers and other pertinent information relevant to a specific truck in a fleet 141 stored on the database 172. Each truck file 200 within the master truck file 205 may have a plurality of primary key type fields including, but not limited to a truck unit number 906, an output device ID identifier 151 value (mandatory), a license plate number 907, a VIN number 908, or a serial number 909. Each truck file 200 within the master truck file 205 may have a plurality of non-primary key type fields such as tare weight, gross weight limit, make, model, year, or age.

A load matrix 174 and load queue 177 may exist within the batch non-transitory storage media 201. The load matrix 174 may contain a plurality of data entry fields for a particular load including, but not limited to date, time, mix ID, slump, quantity, truck unit number 906, output device ID identifier 151 value, license plate number 907, VIN number 908, serial number 909, driver name, driver ID, net weight, make, model, year, age, mix constituent, target weights for mix constituents, comments, and ticket number for each load queued. Multiple loads and their corresponding load matrices 174 may be stored within the load queue 177 in the batch non-transitory storage media 201.

A load queue 177 may exist within the batch non-transitory storage media 201. The load queue 177 may be a storage media comprised of one or more load matrices 174.

The material load verification non-transitory storage media 204 may be in communication with a database 172, which contains the master truck file 205 and one or more truck files 200 for a fleet of trucks 141. The material load verification non-transitory storage media 204 may be in communication with the load matrix 174 within the load queue 177. The material load verification non-transitory storage media 204 may be in communication with the output device reader 160 and/or the reader non-transitory storage media 203. The material load verification non-transitory storage media 204 may be in communication with the batch non-transitory storage media 201 for the purpose of controlling batch plant functionality. The material load verification non-transitory storage media 204 initiates the capture of a truck's 140 output ID unique output device ID identifier 151 value from the output device 150 via the output device reader 160.

The material load verification non-transitory storage media 204 compares the data values captured by the output device reader 160 from an output device 150 and its corresponding output device ID identifier value 151 for the current truck 140 being read in the staging area 301 of the plant 110 with the data fields residing in the pending load matrices 174 residing within the load queue 177. The material load verification non-transitory storage media 204 having instructions stored within when executed executes a method of comprising steps of capturing the current truck's 140 unique output device ID identifier value 151 from the output device 150 affixed to the truck 140 using an output device reader 160 in the staging area 301. The captured output device ID identifier value 151 is compared to all output device ID identifier field values found in the pending load matrices 174 within the load queue 177.

If a match is found, positive audio, visual, or electronic feedback may be given to the truck in the staging area 301 indicating that a load matrix 174 exists in the load queue 177 for the current truck 140 and the matched load matrix 174 may be ready to be weighed automatically at the plant 110. If a match is not found, negative audio, visual, or electronic feedback is given to the truck 140 in the staging area 301 indicating a load matrix 174 does not exist in the load queue 177 for truck in the staging area.

Figure 3:
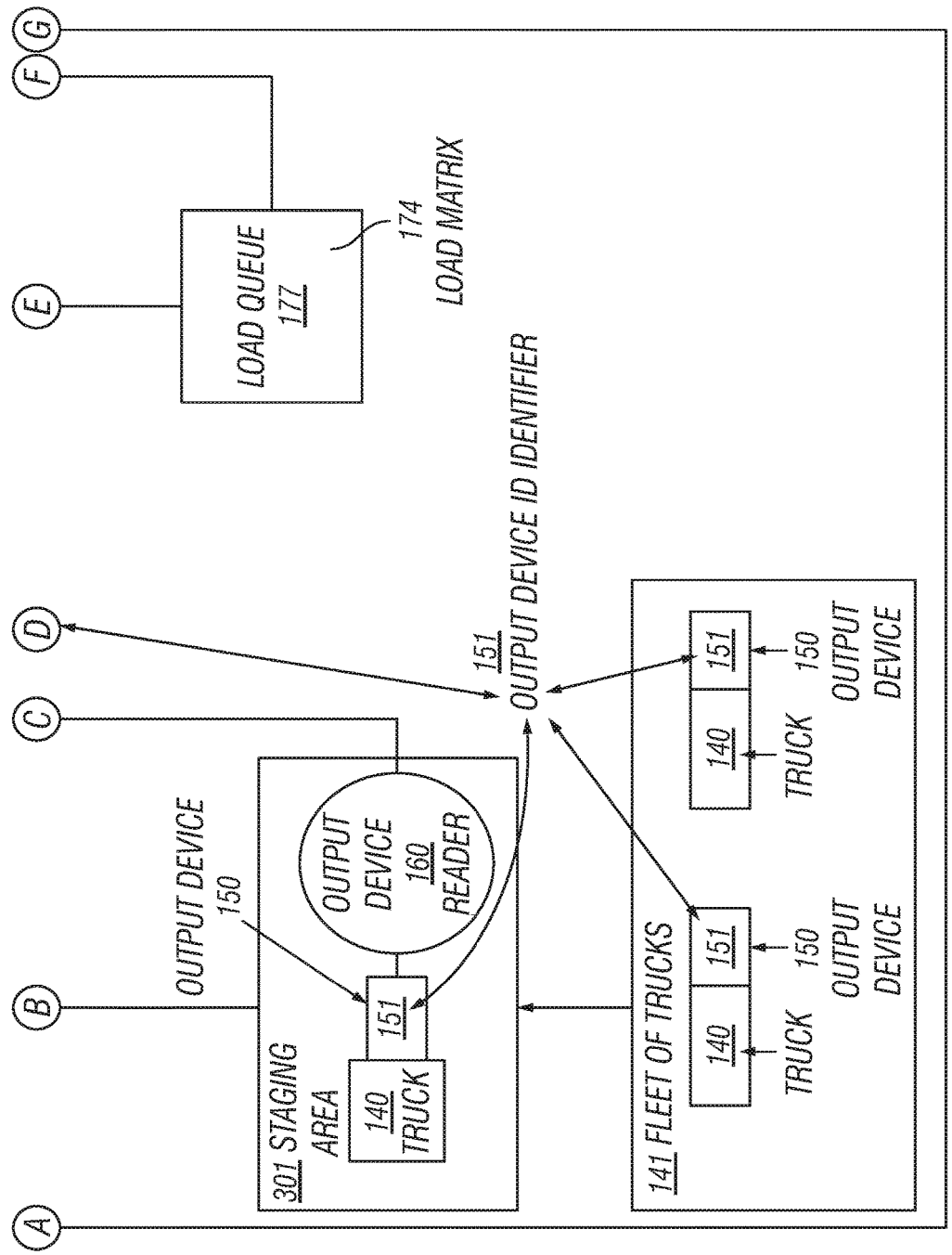
FIG. 3 illustrates and system for utilizing a staging area to automatically initialize a weighing process of one or more loads at a concrete plant or an asphalt plant, in accordance with one embodiment of the present invention.

FIG. 3 illustrates a system for utilizing a staging area to automatically initialize a weighing process of one or more loads at a concrete plant or an asphalt plant 100, in accordance with one embodiment of the present invention.

The system 100 may be configured to which a load matrix 174 within the load queue 177 does not have any primary key type identifiers populated at the time of a load matrix 174 being generated. In other words, a truck 140 may be ticketed without any primary key information being assigned or transmitted at the time of ticketing and the presumption is that when any truck 140 from a fleet 141 enters the staging area 301, the output device 150 for the current truck 140 is read and the primary key information for the current truck 140 is then populated into the most favorable load matrix 174 which exists in the current load queue 177 utilizing non-transitory storage media and hardware. The specific conditions and specifications that determine which load matrix 174 is selected based on the information from the current truck 140 in the staging area 301 is a user configuration decision.

The system 100 may include a plant 110, a truck 140, and a fleet of trucks 141 Each truck 140 contains one output device 150 which contains its own unique output device ID identifier 151. System also includes an output device reader 160, a batch non-transitory storage media 201, a dispatch non-transitory storage media 202, a reader non-transitory storage media 203, and a material load verification non-transitory storage media 204, a third party or a cloud non-transitory storage media 206, and a master truck file 205 composed of one or more unique truck file(s) 200, and a database 172.

The plant 110 includes a staging area 301 and a loading area 312. The plant 110 may be a concrete plant, an asphalt plant, or other suitable plant. The truck 140 enters the staging area 301 near the plant 110 and eventually continues along a path into the loading area 312.

An output device 150 with unique output device ID identifier 151 is affixed to each truck 140 in the fleet 141. Each individual output device 150 has a singular, unique, primary key type identifier 151, which is unique for each truck 140 in the fleet 141 for the purpose of uniquely identifying each truck 140 in the fleet 141. The output device reader 160 is strategically affixed to a fixed position in the staging area 301 of the plant 110, so that it is capable of reading the output device's 150 unique output device ID identifier value 151 of a truck 140 with an identifier technology selected from the group consisting of a radio frequency or a RF transmitter signal, a radio frequency or RF transponder signal, a QR code, a barcode, a camera, a GPS signal, a license plate scanner, an image scanner, an electronic tracking signal, or similar technology.

A master truck file 205, containing a unique truck file 200 for each truck 140 for the fleet of trucks 141 exists on a database 172. Each truck 140 for the fleet 141 has its own unique truck file 200 stored on the database 172 within the master truck file 205. Each truck file 200 within the master truck file 205 may contain a plurality of truck identifiers and other pertinent information relevant to a specific truck in a fleet 141 stored on the database 172. Each truck file 200 within the master truck file 205 may have a plurality of primary key type fields including, but not limited to a truck unit number 906, an output device ID identifier 151 value (mandatory), a license plate number 907, a VIN number 908, or a serial number 909. Each truck file 200, within the master truck file 205, may have a plurality of non-primary key type fields such as, tare weight, gross weight limit, make, model, year, or age.

A load matrix 174 and load queue 177 may exist within the batch non-transitory storage media 201. The load matrix 174 may contain a plurality of data entry fields for a particular load including, but not limited to date, time, mix ID, slump, quantity, truck unit number 906, output device ID identifier 151 value, license plate number 907, VIN number 908, serial number 909, driver name, driver ID, net weight, make, model, year, age, mix constituent, target weights for mix constituents, comments, and ticket number for each load queued. Multiple loads and their corresponding load matrices 174 may be stored within the load queue 177 in the batch non-transitory storage media 201.

A load queue 177 may exist within the batch non-transitory storage media 201. The load queue is a storage media comprised of one or more load matrices 174.

The material load verification non-transitory storage media 204 may be in communication with a database 172 which contains the master truck file 205 and truck files 200 for a fleet of trucks 141. The material load verification non-transitory storage media 204 may be in communication with the load matrix 174 within the load queue 177. The material load verification non-transitory storage media 204 may be in communication with the output device reader 160 and/or the reader non-transitory storage media 203. The material load verification non-transitory storage media 204 may be in communication with the batch non-transitory storage media 201 for the purpose of controlling batch plant functionality. The material load verification non-transitory storage media 204 initiates the capture of a truck's 140 unique output device ID identifier 151 value from the output device 150 via the output device reader 160.

The material load verification non-transitory storage media 204 compares the data values captured by the output device reader 160 from an output device 150 and its corresponding output device ID identifier value 151 for the current truck 140 being read in the staging area 301 of the plant 110 with the data field values stored within the truck files 200 within the master truck file 205 residing in the database 172 with data values within the data fields of the pending load matrices 174 residing within the load queue 177. The material load verification non-transitory storage media 204 having instructions stored within, when executed, executes a method of comprising steps of capturing the current truck's 140 in the staging area 301 of the plant 110 unique output device ID identifier value 151 from the output device 150 affixed to the truck 140 using an output device reader 160. The captured output device ID identifier value 151 is referenced back to the truck files 200 within the master truck file 205 on the database 172.

The searching step includes comparing the captured output device ID identifier value 151 to the output device ID identifier values 151 stored in each of the truck files 200 of the database 172. When the matching truck file 200 is found that contains the captured output device ID identifier value 151 for the current truck 140 read in the staging area 301, all of the primary key data fields for the particular matched truck file 200 are captured then copied from the matching truck file 200. Then the current load matrices 174 are referenced within the load queue 177 and a particular load matrix 174 is selected based on user configuration and any primary key fields that exist in the selected load matrix 174 within the load queue 177 are populated with the primary key values copied from the truck file 200 of the current truck 140 being referenced.

When the load matrix is selected based on user configuration, positive audio or visual feedback is given to the truck 140 to proceed into the loading area 312 from the staging area 301 and the load may be ready to be weighed automatically. If there aren't any load matrices pending for the current truck in the staging area, based on user configuration, negative audio or visual feedback may be given to the current truck in the staging area.

DEFINITIONS

General industry language and description apply to the following. Descriptions may vary, but conceptually the ideas are understood throughout the industry.

Truck—The rolling stock of the fleet, the physical asset capable of hauling a batch, which could be a concrete mixer truck, a dump truck, or similar asset.

Ready mix concrete plant—A physical asset capable of manufacturing concrete.

Asphalt plant—A physical asset capable of manufacturing asphalt.

Batch—The actual combination of mix constituents that makes-up an individual load of concrete or asphalt, based on volumetric intervals.

Staging area—A geographically determined area prior to the discharge point of a plant to which the next truck parks and is read by the output device reader waiting for the current truck to vacate the discharge point. Generally, a truck in the staging area is the next truck to get loaded at the plant.

Mix constituents—Any ingredient, such as, but not limited to, aggregate, water, admixtures, and cementitious products that are an integral part of a batch of concrete or asphalt.

Mix—The final combination of mix constituents or the "recipe" for a particular batch. Specific weight and measure of mix constituents make up the mix.

Batch non-transitory storage media—The system responsible for the weighing, metering, and loading of batches and mix constituents, and controlling automated processes involved with loading a truck at the plant.

Dispatch non-transitory storage media—The system responsible for order entry, scheduling, and ticketing.

Output device—A device of electronic or visual format, capable of communicating with and output device reader. Examples, include, but are not limited to a RF transmitter or a transponder, a QR code, a barcode, a license plate, a decal, a GPS, a Bluetooth device, a Wi-Fi device, a nearfield communications device.

Output device ID identifier value—A primary key type value, unique to each truck a particular fleet, to which the value is stored in the truck file of a database, for the purpose of uniquely identifying each truck in the fleet. This value is stored within the output device and may present this value to an output device reader.

Output device reader—Hardware capable of reading and interpreting the signal from an output device.

Material load verification non-transitory storage media—Material load verification software.

Reader non-transitory storage media—Reader software.

Cloud non-transitory storage media—Cloud software.

Database—When non-transitory storage medias are stored.

Fleet—The totality of all trucks operated by a particular company or location.

Master truck file—Resides on a database, and contains all truck files for a fleet.

Truck file—A member of the master truck file, to which a specific and unique record exist for each truck in a fleet. The truck file is made-up of data fields used to identify a particular truck, and may have a plurality of primary key type fields, and a plurality of non-primary key type fields.

Primary Key—A unique value that may only be used for the identification of a single, particular truck, where no two trucks may share a primary key value.

What is claimed is:

1. A system for automatically initializing a weighing process of one or more loads, comprising:
   a plant including a staging area and a loading area;
   at least one comprising an output device, the output device having a unique output device ID identifier;
   an output device reader in signal communication with at least one of a plurality of non-transitory storage media and arranged to read the output device when the at least one truck is in the staging area;

the plurality of non-transitory storage media comprising at least a reader non-transitory storage media, a material load verification non-transitory storage media, a master truck file containing a truck file for the at least one truck stored on at least one of the plurality of non-transitory storage media, the material load verification non-transitory storage media configured to compares one or more output device ID identifier reader values detected by the output device reader and to compare the one or more output device ID identifier reader values to data fields in the truck file and one or more data fields in a load matrix stored on at least one of the non-transitory storage media, the load matrix comprising at least predetermined amounts of mix constituents of a load to be weighed or metered at the plant for eventual discharge onto a selected truck; and wherein the reader non-transitory storage media cooperatively communicates with the material load verification non-transitory storage media to initiate a weighing process when either, (i) at least one primary key data field in the truck file or (ii) a signal generated by the output device reader, matches a corresponding primary key data value in the load matrix, the weighing process comprising weighing or metering the predetermined amounts of the mix constituents.

2. A system according to claim 1, wherein the output device reader reads the output device identifier values of the output device of the truck in the staging area.

3. A system according to claim 2, wherein the output device comprises at least one of a RF transmitter or transponder, a OR code, a barcode, a license plate, a decal, a GPS, a Bluetooth device, a Wi-Fi device, or a nearfield communication device.

4. A system according to claim 1, wherein the load matrix contains data fields comprising at least one of a date, a time, a mix, a slump, a quantity, a truck unit number, an output device identifier value, a license plate number, a VIN, a serial number, a driver name, a driver, a net weight, a make, a model, a year, an age, one or more comments, and a ticket number.

5. A according to claim 1, wherein primary key values in the truck file comprise one or more of, a truck unit number, a mandatory output device identifier value, license plate number, VIN or a truck serial number.

6. A system according to claim 1, wherein the truck file contains a data entry field that include a mandatory primary key value that is the assigned output device ID identifier value for the at least one truck.

7. A system according to claim 6, wherein the truck file comprises one file within a master truck file that have a plurality of non-primary key data fields that include, tare weight, gross weight limit, make, model, year or age.

8. A system according to claim 7, wherein the truck file resides in the master truck file.

9. A system according to claim 1, wherein the material load verification non transitory storage media is further configured to enable communication of audio or visual feedback to the truck to proceed into the loading area for eventual loading.

10. A system according to claim 9, wherein if there are no load matrices pending for the at least one truck, or no load to be weighed for the at least one truck, the material load verification non-transitory storage media is further configured to communicate negative audio or visual feedback to the at least one truck not to proceed to the loading area.

11. A according to claim 9, wherein user configuration allows load matrices primary key values to be populated if at least one load matrix, within the load queue exists, utilizing data obtained in the staging area from the at least one truck from the output device reader.

12. A system according to claim 1, wherein the material load verification non-transitory storage media is in communication with batch non-transitory storage media, dispatch non-transitory storage media, a n d the reader non-transitory storage media.

13. A system according to claim 1, wherein a master truck file exists comprised of individual truck files for each truck in a fleet of trucks.

14. A according to claim 1 reader, wherein plant functionality is controlled by the plurality of non-transitory storage media depending on user configuration and data obtained in the staging area from the output device.

15. A system according to claim 1, wherein a flow of one or more trucks in the staging area and the loading area of the plant is controlled on a load-to-load basis.

16. A method for automatically controlling weighing a load to be dispensed onto a truck, comprising:
  moving at least one truck into a staging area in a plant;
  automatically reading identifying information disposed on the at least one truck;
  in non-transitory storage media, comparing the automatically read identifying information with identifying information associated with each of a plurality of trucks;
  communicating to the at least one truck to move to a loading area of the plant if the automatically read identifying information corresponds to one of a plurality of trucks associated with properties of a load in a load matrix stored in the non-transitory storage media, the load matrix comprising at least predetermined amounts of mix constituents of to be weighed or metered at the plant for eventual discharge onto a selected truck; and
  initiating a weighing process comprising weighing and metering the predetermined amounts of the mix constituents.

17. The method of claim 16 wherein the automatically reading comprises detecting a signal from at least one of a RF transmitter or transponder, a QR code reader, a barcode reader, a license plate reader, a decal reader, a GPS signal detector, a Bluetooth device, a Wi-Fi device, or a nearfield communication device.

18. The method of claim 16 wherein information associated with each of the plurality of trucks comprises at least one of a date, a time, a mix, a slump, a quantity, a truck unit number, an output device identifier value, a license plate number, a VIN, a serial number, a driver name, a driver, a net weight, a make, a model, a year, an age, a mix constituent, and one or more target weights for mix constituents.

19. The method of claim 16 further comprising communicating to the at least one truck not to move to the loading area if the automatically read identifying information does not correspond to the one of a plurality of trucks associated with the properties of the load in the load matrix.

* * * * *